March 21, 1944.  P. H. O. WEBER  2,344,795
STACKER OPERATING MECHANISM FOR TRACTORS
Filed June 25, 1941
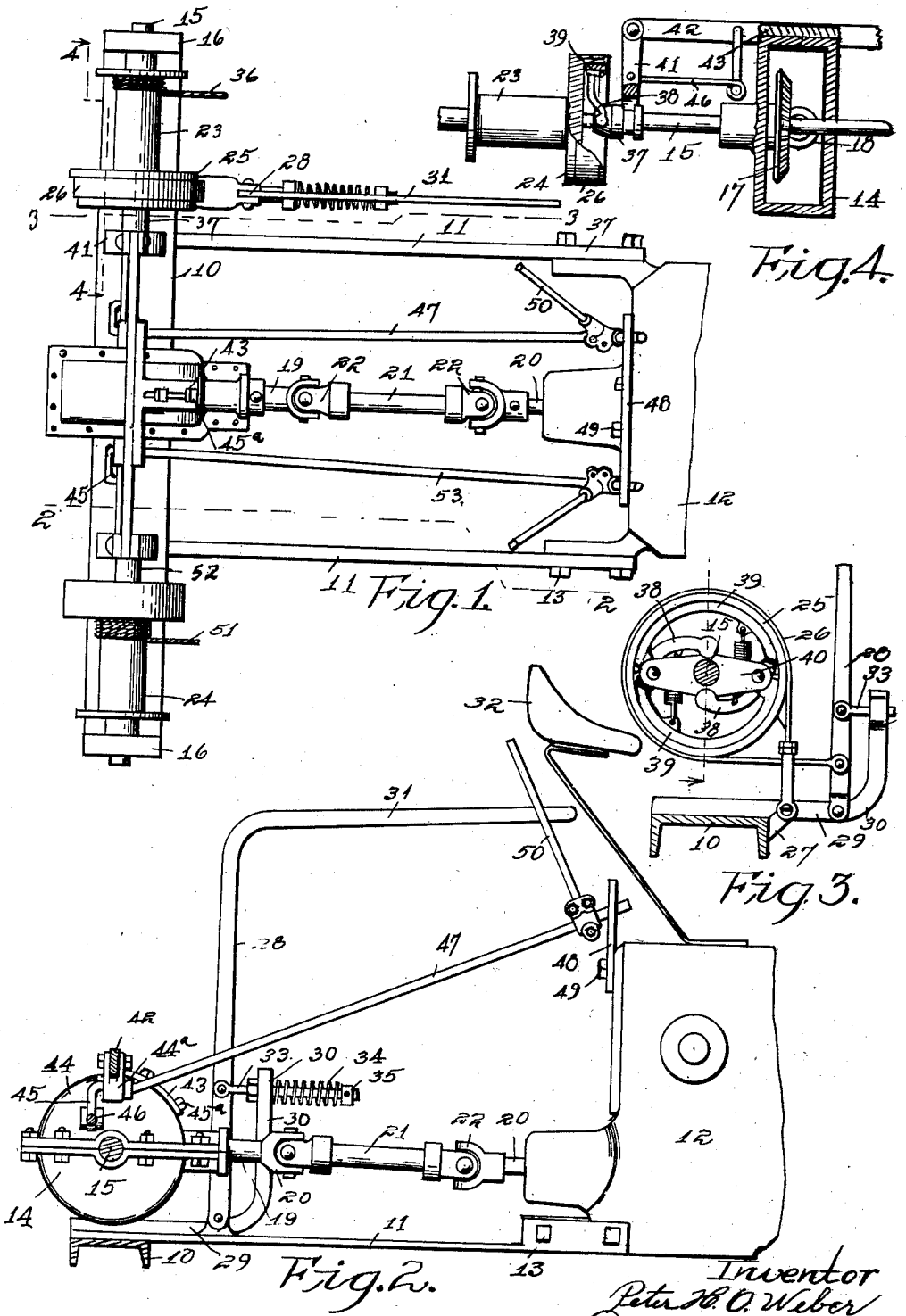

Patented Mar. 21, 1944

2,344,795

UNITED STATES PATENT OFFICE 2,344,795

STACKER OPERATING MECHANISM FOR TRACTORS

Peter H. O. Weber, Dunlap, Iowa, assignor of one-half to George V. Gorham, Dunlap, Iowa Application June 25, 1941, Serial No. 399,659

3 Claims. (Cl. 254—166)

This invention relates to improvements in hay stackers of that type adapted to be supported and carried by a farm tractor with the rake adapted to be elevated from a substantially horizontal position in front of the tractor, to an elevated position and provided with means for pushing a load from the rake to the stacker below the rake.

The object of my invention is to provide an improved mechanism which may be attached to the rear end of a tractor for elevating the rake and for operating the load push-off device of that type of hay stacker illustrated and described in my patent on Hay buck and stacker, No. 2,246,083, issued June 17, 1941, wherein power derived from the power take-off of the tractor is utilized for the purpose of operating said mechanism, the rake and load push off device being operated by means of flexible cables with suitable drums for actuating said cables.

A further object of my invention is to provide in a power device of the type above described, improved hand-controlled means for controlling said cable drums, said hand-controlled means being so located as to be in a convenient position to be actuated by the operator when positioned on the ordinary tractor seat.

A further object of my invention is to provide in connection with the above hand-controlled means, means wherein the said hand-controlled means may be adjusted relative to the power mechanism to adapt the device to be used in connection with various types of tractors, wherein the hand-controlled means will always be in a convenient location.

My invention consists in the construction, arrangement and combination of the various parts of the device, whereby the objects contemplated are attained, as hereinafter more fully set forth, pointed out in my claims, and illustrated in the accompanying drawing, in which:

Figure 1 is a plan view of my improved mechanism showing the manner in which it is connected to a tractor, a segmental portion of which is illustrated;

Figure 2 is a sectional view taken on the line 2—2 of Figure 1;

Figure 3 is a detail sectional view taken on the line 3—3 of Figure 1; and

Figure 4 is a detail sectional view taken on the line 4—4 of Figure 1.

My improved device comprises a support 10, which is preferably in the form of an inverted channel iron provided with horizontal bars 11 for fixing the channel to the rear end of the tractor 12 by any suitable means, such as bolts 13.

Mounted on the central portion of the support 10 is a gear casing 14 having rotatably mounted therein a shaft 15 extending longitudinally above the support 10, and in bearings 16 at each end of said support.

Fixed to the shaft 15 within the gear casing 14 is a bevel gear 17 adapted to be driven by means of a pinion 18 fixed to the rear end of a shaft 19, said shaft 19 being operatively connected with a power take-off shaft 20 of a tractor by means of a shaft 21 and universal joints 22, thus providing means for rotating the shaft 15.

Rotatably mounted on one end of the shaft 15 is a cable drum 23 and on the other end of the shaft a cable drum 24. The drum 23 has at one end a brake drum 25 on which is supported a brake band 26, one end of said band being pivotally secured to a bracket 27 fixed to the member 10, and the other end pivotally secured to an upright lever 28 having its lower end pivotally connected to a horizontal bar 29 terminating in an upwardly extending portion 30, the upper end of the lever 28 terminating in a forwardly extending portion 31 terminating near the seat 32 of the tractor, illustrated in dotted lines.

Pivotally secured to the member 28 is a rod 33 slidably mounted in the upper end of the member 30 and provided with a spring 34 and a collar 35 acting as an abutment for the forward end of the spring wherein the upper end of the lever 28 tends to move forwardly, causing the band 26 to be tightened on the drum 25, thereby frictionally holding the drum 25 against rotation in an anti-clockwise direction, as viewed in Figure 3, and to prevent rotation of the drum 23 in said direction. The drum 23 is adapted to support a hoist cable 36 for elevating a hay rake as the drums 23 and 25 are rotated in a clockwise direction, the band 26 serving to automatically prevent lowering of the rake when the rake has reached any one of a number of elevated positions. The rake is lowered by grasping the member 31 and elevating its free end, causing the upper end of the member 28 to swing rearwardly and the tension of the band 26 to be released, thus permitting the drum to be rotated in an anti-clockwise direction and the rake lowered by gravity. The drums 25 and 23 are caused to rotate in a clockwise direction for winding up the cable 36 by means of a clutch device consisting of a cone 37 slidably mounted on the shaft 15 and adapted to engage levers 38 wherein brake shoes 39 are caused to engage the inner face of the drum 25, the said shoes 39 being pivotally connected to an arm 40 which is fixed to the shaft 15, thereby causing the said drums to be rotated.

The clutch device above described is of ordinary construction and forms no part of the present invention any other than providing means for frictionally locking the shaft to the drums.

For sliding the cone 37 on the shaft 15 I have provided a fork 41 of ordinary construction having its upper end pivotally mounted on a bar 42, said bar having its central portion mounted on a bracket 43, which in turn is adjustably mounted on the cover 44 of the gear case 14 by means of bolts 45a, the bracket 43 having downwardly extending lugs 44a each of which is provided with a crank arm 45, the lower end of which is provided with a link 46 having one end pivotally connected to the arm 41 wherein rocking movement of the member 45 will cause the said arm to be oscillated and the cone to be moved into and out of contact with the arms 38. The arm 45 is provided with a forwardly and upwardly extending rod 47, the upper end of which is mounted in a bracket 48 fixed to the back end of the tractor 12 by means of bolts 49. A lever 50 is adjustably mounted on the upper end of the rod 47 and has its free end terminating near the seat 32.

By this arrangement it will be seen that swinging of the upper end of the lever 50 toward and from the seat 32 will cause the shaft 47 to be rocked and, in turn, the arm 45, providing means for operatively connecting the drums 23 with the shaft 15, the bracket 43 being adjustably mounted on the cover 44 of the gear casing to provide means whereby the angularity of the rod 47 relative to the horizontal may be varied to accommodate tractors of various heights, the lever 50 being adjustably mounted on the rod 47 longitudinally to accommodate various spacings between the support 18 and the rear end of the tractor.

The drum 24 is adapted to receive a cable 51 for the purpose of controlling the load push-off device from the rake, the said drum being provided with a clutch member 52 similar to the clutch member 37 and actuated by means of a rod 53 similar to the rod 47.

Thus it will be seen I have provided means for actuating and lifting the rake element of a hay stacker of the type above described and the means for actuating the push-off device, wherein the operating controls are all within easy reach by an operator in position on the tractor seat, and provided with means for adjustably fixing the elevating mechanism to various types of tractors, the mechanism being of very simple and durable construction which is positive in its operation and which may be easily and quickly attached to the ordinary farm tractor.

I claim as my invention:

1. In a device of the class described, a tractor frame, a seat mounted on said frame, a gear support mounted on said frame, a gear casing carried by said support, a shaft rotatably mounted in said gear casing and longitudinally of said support, means within said gear casing for rotating said shaft, a cable drum rotatably mounted on each end of said shaft, a clutch device operatively connecting each of said drums to said shaft, a bracket adjustably mounted on said gear casing, a bracket adapted to be attached to the tractor frame near said seat, a control rod for each clutch mounted in said brackets, means operatively connecting one end of each of said control rods to its respective clutch device for operatively connecting the clutch to said shaft, and a lever on the other end of each of said rods, said levers being located near the tractor seat.

2. A tractor frame including a power take-off shaft, a seat mounted on said frame, a gear support mounted on and rearwardly of said frame, a drive shaft rotatably mounted longitudinally of said gear support, means actuated by said power take-off shaft for rotating said drive shaft, a housing for the said means, a cable drum rotatably mounted on said shaft, a clutch device operatively connecting said drum to said shaft, a bracket mounted on and overhanging said housing, a second bracket attached to the tractor frame near said seat, an upwardly and forwardly inclined rock shaft having one end supported in the first bracket and the other end mounted in said second bracket, means operatively connecting the lower end of said rock shaft to said clutch device for actuating the clutch as said shaft is rocked, and a hand-actuated lever mounted on the upper end of said rock shaft having its free end terminating near said seat.

3. In a device of the class described, a tractor frame, a seat mounted on said frame, a gear support carried by said frame and rearwardly thereof, a rotatable power shaft mounted longitudinally of said support, means actuated by power derived from said tractor for rotating said shaft, a cable drum mounted on each end of said power shaft, a clutch device for each drum for operatively connecting it to said shaft, a horizontal bar carried by said gear support and between said clutches, a clutch operating arm pivotally connected to and depending from each end of said bar, means operatively connecting each arm to a respective clutch, a bracket supported by said tractor frame below said seat, rock shaft bearings supported by said horizontal bar, upwardly and forwardly inclined rock shafts having their lower ends rotatably supported in said rock shaft bearings and their upper ends in said bracket carried by said tractor frame, the lower end of each rock shaft having a crank arm, a link connecting each crank arm with a clutch operating arm, and a lever mounted on the upper end of each rock shaft, the free end of each lever terminating near said tractor seat.

PETER H. O. WEBER.